(12) United States Patent
Hope et al.

(10) Patent No.: US 6,183,025 B1
(45) Date of Patent: Feb. 6, 2001

(54) BUMPER ASSEMBLY

(75) Inventors: Frederick John Charles Hope; Robert James Hope, both of Surrey (GB)

(73) Assignee: Hope Technical Developments LImited, Ascot (GB)

( * ) Notice: Under 35 U.S.C. 154(b), the term of this patent shall be extended for 0 days.

(21) Appl. No.: 09/045,866

(22) Filed: Mar. 23, 1998

(30) Foreign Application Priority Data

Mar. 25, 1997 (GB) .................................................. 9706164

(51) Int. Cl.$^7$ .................................................. B60R 19/24
(52) U.S. Cl. .................................. 293/131; 293/2; 293/5
(58) Field of Search ............................ 293/1, 2, 4, 131, 293/107, 135, 136, 137, 145, 134, 132, 5

(56) References Cited

U.S. PATENT DOCUMENTS

| | | | |
|---|---|---|---|
| 3,718,332 | * 2/1973 | Jones | 293/4 X |
| 3,744,588 | * 7/1973 | Nave, Sr. | 293/4 X |
| 3,830,329 | * 8/1974 | Sumida | 293/1 X |
| 3,853,199 | * 12/1974 | Hirashima et al. | 293/4 X |
| 3,883,156 | * 5/1975 | Frazier | 293/2 X |
| 3,923,330 | * 12/1975 | Vaill, Sr. et al. | 293/4 |
| 3,945,672 | 3/1976 | Wong . | |
| 4,105,237 | * 8/1978 | Vaill, Sr. et al. | 293/2 X |
| 4,247,138 | * 1/1981 | Child | 293/131 X |
| 4,546,840 | * 10/1985 | Yukishige et al. | 293/2 X |
| 4,591,019 | * 5/1986 | Fisher et al. | 293/5 X |
| 4,641,871 | * 2/1987 | Vaughn | 293/5 X |
| 4,991,681 | * 2/1991 | Paulson | 293/5 X |
| 5,230,543 | * 7/1993 | Douglas et al. | 293/2 |

FOREIGN PATENT DOCUMENTS

| | | | |
|---|---|---|---|
| 565517 | * 3/1958 | (BE) | 293/4 |
| 630827 | * 12/1963 | (BE) | 293/4 |
| 1192983 | * 12/1959 | (FR) | 293/2 |
| 2107909 | * 5/1983 | (GB) | 293/131 |
| 2 122 551 | 1/1984 | (GB) . | |

* cited by examiner

*Primary Examiner*—Joseph D. Pape
(74) *Attorney, Agent, or Firm*—Burns, Doane, Swecker & Mathis, L.L.P.

(57) ABSTRACT

A road vehicle is disclosed having a bumper assembly fitted to the rear end of the vehicle. The bumper assembly includes a beam extending across the rear end of the vehicle and supported by an arm from the vehicle so that the beam is displaceable from a rest position in a direction towards or beneath the vehicle in the event of contact with an obstacle. The beam is provided with a spring device for biasing it towards its rest position and the spring device is directly linked to a device for signalling displacement of the beam

18 Claims, 2 Drawing Sheets

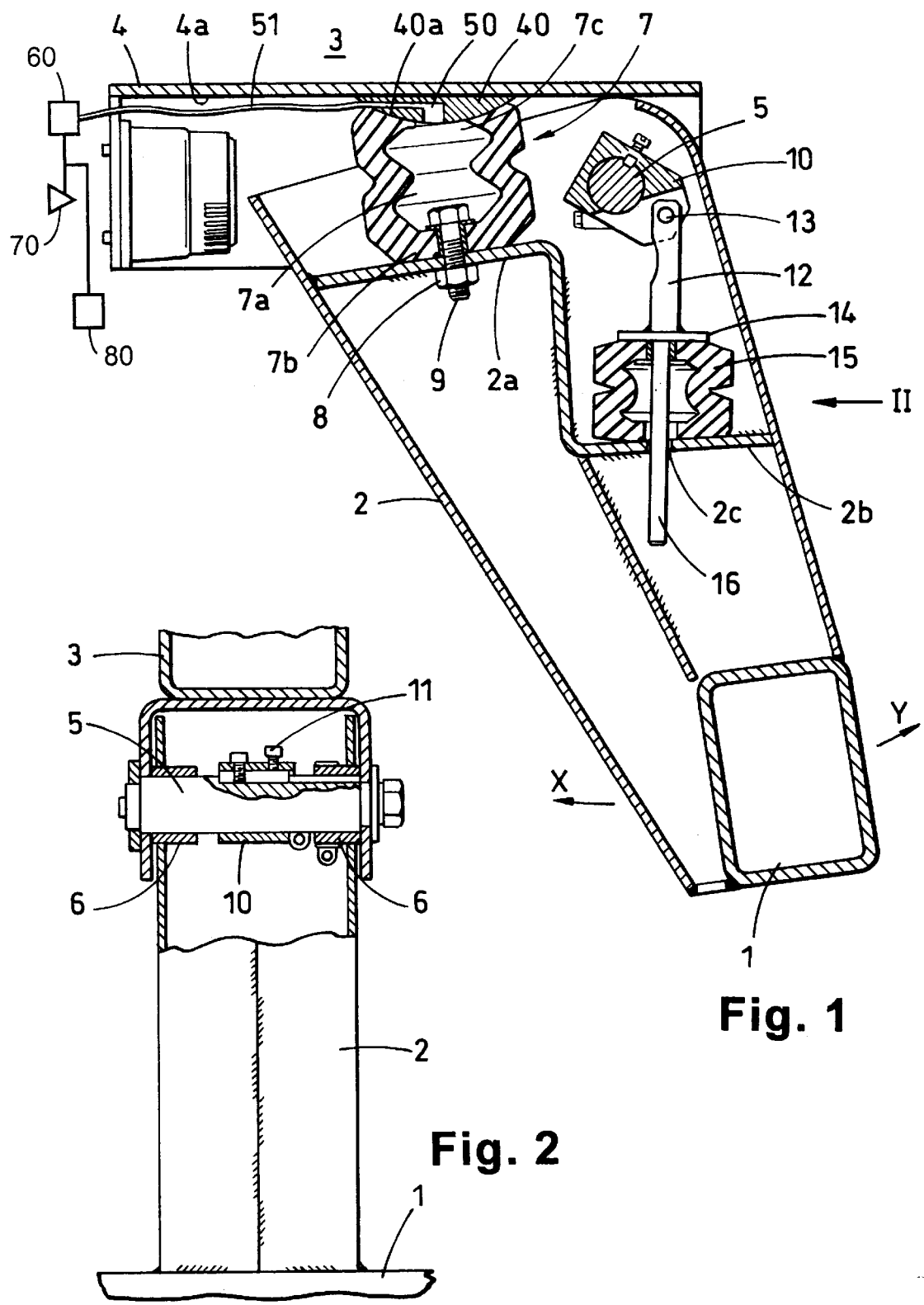

BUMPER ASSEMBLY

This invention relates to a bumper assembly for a road vehicle such as a rigid or articulated lorry, a passenger coach, a bus or a van and, more particularly, to a sensing arrangement for use with the bumper assembly.

Because of accidents involving vehicles with high ground clearance, it has been recommended practice to fit a rigid bumper bar to such vehicles so as to prevent smaller vehicles such as passenger cars from being forced underneath the large vehicles in an accident. Legislation requires vehicles of a certain minimum weight to be fitted with such rigid bumper bars at a specified height beneath the rear of the vehicle.

One proposed road vehicle bumper assembly comprises a beam which is supported by a pair of arms from the vehicle in such a manner that the beam is displaceable from a rest position in a direction towards or beneath the vehicle in the event of contact with an obstacle. Springs are provided for biasing the beam towards its rest position. The bumper assembly includes sensors for detecting displacement of the beam and activating a warning device.

One disadvantage of this proposed bumper assembly is its susceptibility to damage when the vehicle moves over surfaces of changing incline. In particular, when a vehicle leaves a ferry, it travels down an inclined ramp and then up an inclined road surface. At the junction of the two inclined surfaces, the bumper assembly tends to hit the ground, and this can damage the bumper assembly.

The problem is addressed by a bumper assembly which is the subject of published British Patent No. 2122551.

The said patent specification describes a bumper assembly for a road vehicle which can prevent under-running of smaller vehicles, and which has a reduced chance of accidental damage during operation of the vehicle.

In particular, the invention of published British Patent No. 2122551 relates to a road vehicle having a bumper assembly fitted thereto, the bumper assembly comprising a beam which is pivotally supported by an arm from the vehicle so that the beam is displaceable from a rest position in a first direction towards or beneath the vehicle in the event of contact with an obstacle, spring means for biasing the beam towards its rest position, and means for holding the beam in its rest position, the holding means exerting a force on the beam so as to prevent the beam being displaced in a direction opposed to said first direction, unless the beam is subjected to a predetermined force, wherein a hollow rubber spring constitutes the spring means.

The same patent also relates to a road vehicle having a bumper assembly fitted thereto, the bumper assembly comprising a beam which is pivotally supported by an arm from the vehicle so that the beam is displaceable from a rest position in a first direction towards or beneath the vehicle in the event of contact with an obstacle, spring means for biasing the beam towards its rest position, and means for holding the beam in its rest position, the holding means being such as to prevent the beam being displaced in a direction opposed to said first direction, unless the beam is subjected to a predetermined force, wherein a hollow rubber spring constitutes said spring means. Preferably, either of the bumper assemblies further comprises sensing means for detecting displacement of the beam and activating a warning device.

Thus, when the vehicle is being manoeuvred in restricted conditions, the bumper assembly is likely to be the first part of the vehicle which touches an obstacle; and, after being displaced a short distance (which will not damage the obstacle or the vehicle), an audible or visual warning will be activated so that the driver will be immediately aware that his vehicle is in contact with an obstacle.

In general, the beam will be displaceable through a predetermined distance. Thus, in the event of collision with another vehicle, there will be a deceleration effect during which the spring means of the bumper assembly will absorb some of the energy of impact. Thereafter, the beam will meet a stop position on the vehicle, which will prevent a smaller vehicle from penetrating beneath the larger vehicle.

In a preferred embodiment of British Patent No. 2122551, the sensing means is a magnetic Reed switch which comprises a permanent magnet, a sensing device responsive to the magnetic field of the permanent magnet, and a shield which is positionable between the magnet and the sensing device to prevent the sensing device being influenced by the magnetic field of the magnet, wherein the magnet and the sensing device are fixed to a stationary part of the assembly, and the shield is fixed to a movable part of the assembly. Advantageously, the shield is arranged to pivot with the arm as the beam is displaced from its rest position.

The arm may be pivotally supported from the vehicle by a mounting channel fixed to the vehicle and a pivot pin which is fixed to the mounting channel, the arm being pivotally mounted on the pivot pin. In this case, the shield may be fixed to the arm for rotation therewith. Preferably, the shield is a sector-shaped member made of magnetic material.

Advantageously, a hollow rubber spring constitutes the spring means. The hollow rubber spring may be fixed to an internal flange of the arm, in which case the mounting channel may provide an abutment for the hollow rubber spring.

In a preferred embodiment of the above-mentioned Patent, the holding means is constituted by a second spring means, the second spring means being positioned so as to bias the beam towards its rest position in the opposite direction from that in which the first spring means biases the beam towards its rest position.

Advantageously, the second spring means is preloaded so that, when the beam is in its rest position, the first-mentioned spring means is subjected to a compressive load. The second spring means may be a hollow rubber spring which is positioned within the arm between a flange fixed within the arm and a retaining plate.

Preferably, a transmission element is detachably fixed to the pivot pin for rotation therewith, and the retaining plate is provided with a link which is pivoted to the transmission element.

Advantageously, the warning device is a bleeper unit. Preferably, the sector-shaped shield is such that the bleeper unit is activated when the beam is displaced from its rest position in said first direction through a first predetermined angle, and whenever the beam is displaced from its rest position in a second direction opposed to said first direction through a second predetermined angle. In a preferred embodiment, the sector-shaped shield is such that said first predetermined angle is substantially 2° mid said second predetermined angle is substantially 74°.

While the above-mentioned assembly has been found to perform its intended function well the reed switch of the sensing means needs to be located in the vicinity of the bumper assembly, often at a location proximate to a pivot arrangement which is provided for allowing the arms to move with respect to the stationary part of the assembly. Since the bumper assembly is subject to typically harsh operational environments, in particular when fitted to a commercial vehicle, the sensing means must also be capable of enduring such harsh environments. The sensing means is potentially vulnerable to damage through abuse, vibration or climatic conditions.

Some protection may be provided by housing the sensing means, in the above case the reed switch, within an enclosure, but this can lead to a more complicated replacement procedure and may extend repair times when working on the assembly which is undesirable for commercial vehicles.

Other types of sensors including mechanical, solid state, semi-conductor or optical devices may be considered as alternatives to the reed switch based sensing means. However, they also normally need to be located in the vicinity of the bumper assembly for operation, and the above-mentioned problems will not necessarily be obviated. Mechanical contact based switches may also be undesirable when used in environments where flammable substances are being transported, due to the safety risk associated with sparks they may produce in operation. For the same reason, they may pose a safety risk if the vehicle is involved in an accident and petroleum fuel escapes from the fuel tank.

The above-mentioned sensing means can also be costly to produce and fit to a vehicle since it involves a number of components and generally requires a degree of calibration to be performed when initially fitted to the bumper assembly.

It is an object of the present invention to provide a bumper assembly having a sensing means which mitigates the above-mentioned problems.

It is another object of the present invention to provide a bumper assembly having a sensing means which is cost effective to produce and fit.

It is a further object of the present invention to provide a bumper assembly having a sensing means having a minimum number of components.

In accordance with one aspect of the present invention there is provided a road vehicle having a bumper assembly fitted thereto, the bumper assembly comprising a beam which is supported by an arm from the vehicle so that the beam is displaceable from a rest position in a direction towards or beneath the vehicle in the event of contact with an obstacle, and spring means for biasing the beam towards its rest position wherein the spring means directly provides an signal indicative of displacement of the beam.

In accordance with another aspect of the present invention there is provided a road vehicle having a bumper assembly fitted thereto, the bumper assembly comprising a beam which is supported by an arm from the vehicle so that the beam is displaceable from a rest position in a direction towards or beneath the vehicle in the event of contact with an obstacle, and spring means for biasing the beam towards the rest position wherein the spring means directly provides a signal indicative of displacement of the beam, said spring means defining one or more chambers.

In this case the spring means is arranged such that the volume of the or each chamber may be reduced by compression of the spring means on displacement of the beam, said reduction of volume causing at least partial expulsion of contents of the or each chamber to provide the said signal indicative of displacement of the beam.

In a preferred embodiment, the or each chamber is defined by hollow interior portions of the spring means. In this case, the spring means may be arranged to bear against a respective sealing surface when the beam is in the rest position, the sealing surface bearing against the spring means to sealingly close the hollow interior portion and close the or each chamber. The spring means may additionally or alternatively bear against a sealing surface when the beam is displaced in the direction towards or beneath the vehicle, the sealing surface bearing against the spring means to sealingly close the hollow interior portions and close the or each chamber.

The sealing surface may be part of the bumper assembly. The sealing surface may be provided by a sealing seat profiled to engage with the spring means. The sealing seat may be a discrete component or integral with the bumper assembly. In each case, a self-cleaning wiping action is advantageously produced between the spring means and the sealing surface as they are brought into engagement with each other.

The or each chamber may be in fluid communication with a pressure-sensing device, the said pressure-sensing device serving to register when the beam is displaced. The or each chamber may alternatively or additionally be in fluid communication with a pneumatically-activated actuator, said actuator being activated when the beam is displaced. In each of the arrangements, the pressure-sensing device or the actuator is preferably located remote from the spring means. A length of tubing may be provided for connecting the or each chamber with the pressure-sensing device and/or actuator.

Preferably, there is provided a holding means for maintaining the beam in the rest position during normal operational use, and the holding means may serve to bias the beam in a direction towards or beneath the vehicle.

When the spring means is arranged to be engageable with the sealing surface, the holding means may further serve to maintain the spring means in engagement with the sealing surface.

Preferably, a warning device is connected to the pressure sensing device and/or the pneumatically-activated actuator, said warning device being operable on displacement of the beam. Any suitable type of warning device may be employed which might produce a visual signal or audible signal. A warning device could be located proximate to the driving position or a horn could be used as the warning device.

The pressure sensing device or the actuator may be connected to the vehicle braking system to produce application of the brakes on displacement of the beam A form of bumper assembly which is constructed in accordance with the invention, will be described by way of example, with reference to the accompanying drawings, in which:

FIG. 1 is a part-sectional elevation of a form of bumper assembly, and shows part of the rear of a road vehicle to which the bumper assembly is attached;

FIG. 2 is a view, partly in section, in the direction of the arrow II in FIG. 1.

Figure 3:
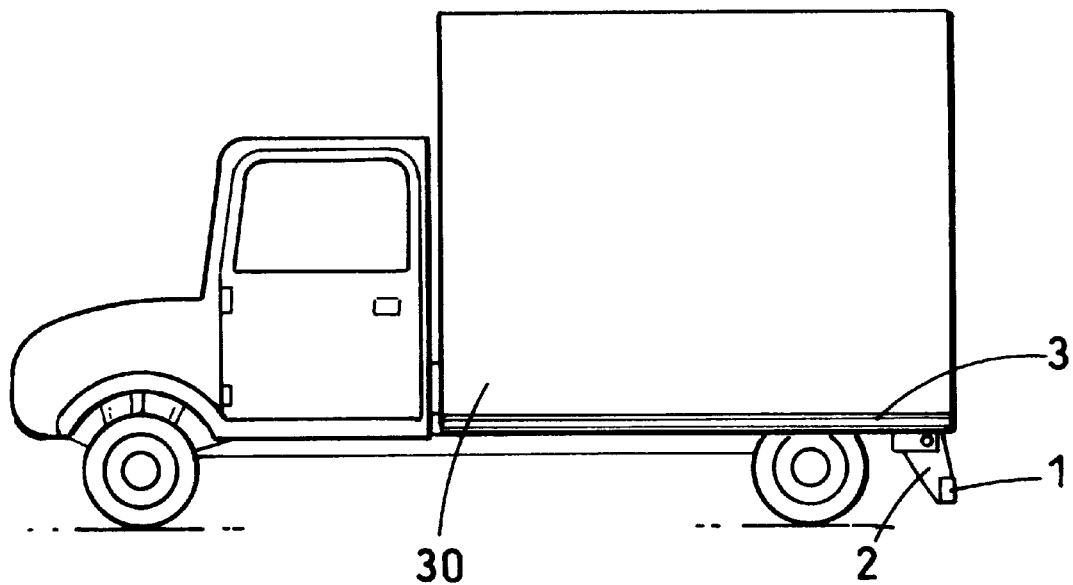
FIG. 3 is a diagrammatic side elevation of the bumper assembly fitted to the rear end of the vehicle.

Referring the drawings, FIG. 1 shows a bumper assembly comprising a longitudinal beam 1 which is supported by two arms 2 (only one of which can be seen in FIG. 1), on the chassis 3 of the vehicle. Each arm 2 is pivotally supported by a respective mounting channel 4 fixed to the chassis 3. The beam 1 is arranged to extend substantially across the entire width of the vehicle. As can be seen best in FIG. 2, each of the arms 2 is pivotally mounted on a respective pivot pin 5 by means of a pair of tubular collars 6. The collars 6 of each arm 2 are welded to that arm so as to constitute aligned bearing sleeves. Each pivot pin 5 is supported in its mounting channel 4.

In use, each of the arms 2 is displaceable from the position shown in FIG. 1 in a clockwise direction. Radial movement of each of the arms 2 is restricted by spring means in the form of a respective hollow rubber spring 7 such as one manufactured by Aeon Limited. The spring 7 has a hollow interior portion 7a to define a chamber. One end 7b of each spring 7 is fixed to an internal flange 2a of the respective arm 2 by means of a nut 8 and a bolt 9. In one arrangement, the other end 7c of each spring 7 bears against a sealing surface provided by a portion of the inside underneath surface 4a of the respective mounting channel 4 close to the chamber defined by interior portion 7a.

In the arrangement shown, a sealing seat 40 is provided wherein the sealing surface is formed by surface 40a of the seat 40. The surface 40a is profiled to complement the portions of the spring 7 against which it bears and thus form a seal therebetween when they abut each other. The seat 40 may be mounted to the surface 4a of the mounting channel as a discrete component or may be formed as an integral part of the mounting channel 4.

One or more apertures 50 are provided in the seat and each connected to tubing 51. Tubing 51 is in turn connected to a pressure sensor, a pneumatically activated actuator, or both. Where the seat 40 is not provided and the spring 7 bears directly against a sealing surface provided by a portion of the underneath surface 4a of the channel 4, the one or more apertures or the like may be provided in the structure. In this case, the or each aperture will be located to be communicable with the hollow interior portion 7a of the spring 7 as it bears against the surface 4a of the channel 4. Again, tubing 51 is provided which connects the or each aperture to a pressure sensor, a pneumatically activated actuator, or both, in a manner similar to that described above.

A holding means may be provided for maintaining the beam in a rest position during normal use. In the arrangement illustrated, this is provided by a respective transmission element 10 fixed to the pivot pin 5 of each arm 2 for rotation therewith, a respective grub screw 11 being provided for this purpose. One end of a respective link 12 is pivotally attached at 13 to each of the transmission elements 10. The other end of each link 12 is welded to a respective compression plate 14. A respective, pre-loaded, hollow rubber spring 15 (such as one manufactured by Aeon Limited) is positioned beneath each compression plate 14 and a respective internal flange 2b provided within the associated arm 2. As shown in FIG. 1, the internal flanges 2a and 2b of each arm 2 form part of a single component which is welded within that arm. A respective guide rod 16 is fixed to each of the compression plates 14, each of these rods passing through the corresponding spring 15 and through a respective aperture 2c in the corresponding flange 2b.

The pre-loaded springs 15 are effective to hold the bumper assembly in its normal working (rest) position, this position being shown in FIG. 1. Each of the springs 15 is pre-loaded in the following manner. First, each spring 15 is positioned within its arm 2 in the un-loaded condition. The associated mounting channel 4 is then located over each of the arms 2, and the associated pivot pin is slid into position through the respective tubular collars 6. The link 12 of each spring 15 is then attached to the associated transmission element 10 (which has already been loosely fitted around its pivot pin 5). The grub screws 11 are then screwed into position to lock the transmission elements 10 to their pivot pins 5. The springs 15 are then pre-loaded by turning the pivot pins 5 through approximately 75°, after which the pivot pins are bolted tightly to their mounting channels 4. The degree of pre-loading of the springs 15 is sufficient to compress the main springs 7 by a slight amount.

One effect of the pre-loading is to maintain the springs 7 in engagement with the sealing surface, either in the case where the sealing surface is provided by a portion of the inside underneath surface 4a of the mounting channel 4, or the sealing surface is provided by the surface 40a of the sealing seat 40. In each case, this prevents dirt, moisture or other foreign matter becoming lodged between the appropriate sealing surface and the spring 7, which may be detrimental to the effectiveness of the seal formed therebetween. Furthermore, such foreign matter is prevented from gaining access to the hollow interior portions 7a of the springs 7, the apertures 50 and tubing 51. The admittance of such matter is undesirable and may damage the pressure sensor or pneumatically activated actuator.

In use, if another vehicle strikes the beam 1 (or if the beam strikes an object during reversing), that is to say when the beam is subjected to a force in the direction ol the arrow X shown in FIG. 1, the bumper assembly will pivot in a clockwise direction (as seen in FIG. 1) about the pivot pins 5. As the arms 2 pivot, the hollow rubber springs 7 are compressed between their flanges 2a and the sealing surface provided by portions of the inside underneath surface 4a of the respective mounting channel 4 or sealing surface 40a of the respective sealing seat 40, depending on the arrangement employed. The compression of these springs resists the pivotal movement of the arms. The springs 7 are, therefore, effective to absorb the energy of slow-speed heavy impacts. This pivotal movement of the arms 2 continues until the upper end portions 2d of the arms 2 abut against the surfaces 4a of the mounting channels 4.

As the springs 7 are compressed, the volume defined by the hollow interior portions 7a is simultaneously reduced. The portions 7a generally contain air (but could contain any suitable fluid substance). Because the springs 7 are sealingly engaged with the sealing surface provided by portions of the inside underneath surface 4a of the respective mounting channel 4 or the sealing surface 40a of the respective sealing seat 40, the reduction of the volume of portions 7a causes a corresponding increase of pressure therein. This results in an amount of air to be expelled from portions 7a and pass via aperture 50 into the tube 51, which is connected to a pressure sensor 60 or a pneumatically activated actuator. Within the tube 51 there will also be an associated increase in pressure and, thus, compression of the springs 7 as the beam 1 is moved in the X direction will be sensed by the pressure sensor or pneumatically activated actuator (not shown).

The pressure sensor 60 or pneumatically activated actuator may be a 'Herga' type pressure switch or an air operated switch as supplied by R. S Components Ltd. Herga switches are obtainable from Herga Electric of Northern Way, Bury St. Edmunds, Suffolk, England IP32 6NN, and Rs switches are supplied by RS Components Ltd of PO Box 888, Corby, Northants, England, NN17 SUB.

In both switches, a diaphragm or bellows is deflected by an increase in air in the tube 51 to which the switch is connected. This increase in pressure causes a .microswitch to close and an electrical warning circuit which includes a visual or audible warning device to be activated. The warning circuit receives power from the vehicle's brake light circuit and the microswitch is maintained in the 'on' position by a latching relay controlled by the current flowing in the brake light circuit. As soon as the brakes are released and current ceases to flow in the brake circuit, the contact switch in the pressure sensor reverts to the open position.

Although a considerable force may be required to fully compress the springs 7, it is generally preferred that the springs 7 may be partially compressed with substantially less effort whilst being sufficient to be registered by the pressure sensor or pneumatically activated actuator. Consequently, more sensitive collision detection may be provided with the present invention, in comparison to that provided by some other known methods.

For the arrangement shown in FIGS. 1 and 2, the beam 1 is also displaceable in the direction Y. If the beam strikes an obstruction so that a force is applied thereto in the direction of the arrow Y (see FIG. 1), the whole assembly will try to pivot in all anti-clockwise direction about the pivot pins 5. If the force applied in the direction of the arrow Y is greater than the combined force resulting from the weight of the beam 1 and the biasing force of the springs 15, the beam will pivot in an anti-clockwise direction about the pivot pins 5. As the beam 1 is pivoted in this manner, each of the pre-loaded springs 15 resists this movement until its link 12 moves over centre, that is to say until the longitudinal axis of that link moves across the line joining the centre of the associated pivot pin 5 and pivotal axis 13. The beam 1 can pivot in this manner until the upper surfaces of the arms 2 are substantially horizontal. In this position, the links 12 lie at an angle of about 16° to the horizontal. From this position, the bumper assembly can return to its normal working position owing to the weight of the beam 1. This return movement is assisted by the pre-loading of the springs 15 once the links 12 have again passed over centre.

In practice, the beam should return naturally to its normal working (rest) position under the action of gravity and the force of the springs 15.

The pre-loading of the springs 15 is effective not only to hold the assembly in its rest position, but also substantially reduces rebound of the assembly following return movement from the position in which the beam 1 is horizontal. Thus, as the beam 1 returns from the horizontal position, it comes down fairly heavily owing to the combined action of gravity and the springs 15. The pre-loading of the springs 15 substantially prevents rebound of the assembly which would otherwise occur following the compression of the main springs 7 caused by the return movement of the assembly. Moreover, because the main springs 7 are subjected to pre-loading, the assembly is extremely sensitive to forces tending to move the beam 1 in the direction of the arrow X.

Although the beam can move in the direction Y, it is only anticipated that this should happen occasionally. An example may be when the assembly is caused to move in the direction Y through striking an object. In this case, it is desirable that the assembly should yield to avoid sustaining damage. However, such a feature is not essential for operation of the present invention.

Moreover, for the arrangement illustrated, the movement of the beam 1 in the direction Y will cause the springs 7 to be separated from their respective sealing surfaces and possibly allowing foreign matter to enter the sealing regions, the portions 7a and the apertures 50. This is undesirable for the reasons discussed above. various modifications may be performed to overcome this problem, including permanently affixing the springs 7 to the mounting channel 4, and disassociating the spring from the internal flange portions 2a of the arms 2. This would still allow the flange portions 2a to bear against the springs 7, whilst a force was present in the X direction. This would also allow the springs 7 to remain in contact with their respective sealing surfaces when the arm is moved in the Y direction.

Another modification would be to introduce a further member which is pivotable about pin 5 or movably associated with the static part of the bumper assembly and interposed between flange portion 2a and the spring 7. Preferably, the member would be biased in a direction to exert a nominal force against the end portion 7b of the spring 7, and maintain it in contact with its sealing surface 4a of the channel 4, or 40a of the sealing seat 40.

A sensing means based on that of British Patent No. 2122551 could further be provided to detect movement in the Y direction.

Where the springs 7 are permitted to be separated from their respective sealing surfaces provided either by portions of the surface 4a of the channel 4, or surface 40a of the sealing seat 40, it is preferable that on re-abutment, a self-cleaning wiping action is produced in the sealing regions.

In further arrangements of the bumper assembly where movement of the beam 1 in the Y direction is not anticipated, alternative means of holding the beam in the rest position may be provided whilst still holding the springs 7 in a slightly compressed slate. In this case, the holding means comprised of components 10 to 16 would not be required and could be replaced with a simple latching device or the like.

When the compression of the springs 7 produces an appropriate pressure to be established within portions 7a, this pressure is capable of being registered by the pressure sensor, or the pneumatically activated actuator. A warning device 70 connected to the pressure sensor 60 or pneumatically activated actuator will be caused to operate thus, indicating that the arm 1 has been displaced in direction X. The warning device 70 may be an audible bleeper unit located on the vehicle, optionally adjacent to the bumper assembly. A warning device 70 may be located in proximity to the driving position. Furthermore, the horn of the vehicle may also be activated. In this case, the horn is connected to an air reservoir by a line containing a pneumatic valve which is controlled by the pressure sensor or pneumatically activated actuators. In this case it is preferable to include a further valve in the line leading from the air reservoir, so that the pressure in the air reservoir cannot drop below a predetermined minimum pressure of say 80 p.s.i. Visual warning devices may also be employed.

In another arrangement which may be an alternative or complementary to the -above system, compression of the springs 7 again produce an appropriate pressure to be established within portions 7a, this being registered by the pressure sensor, or causing activation of the pneumatically activated actuator. The vehicles braking system 80 is connected to the pressure sensor 60 or pneumatically activated actuator to cause application of the vehicles brakes when the beam is displaced in direction X. This feature may be disabled for normal road driving. An example of such a braking system is the subject of published British Patent No. 2173560.

Further features of the present invention may include the provision to adjust the sensitivity of the means for detecting compression of the springs 7, and may further include means for compensating for changes in atmospheric pressure.

The sealing seat 40 may be fitted to the mounting channel 4 during production of the bumper assembly, which would allow the warning system to be fitted with minimum effort at a later date.

It is understood that the sensing arrangement for a bumper assembly in accordance with the present invention is not limited by the specific examples contained herein. It will be apparent to those skilled in that art that a range of designs are encompassed by the present invention where the spring means are also used to provide a signal indicative of displacement of a movable portion of a bumper assembly with respect to a static portion.

FIG. 3 shows, diagrammatically, a goods vehicle 30 having a bumper bar 1 fitted to its rear end by attachment to a chassis member 3.

Although each of the bumper assembles described above is positioned at the rear of the vehicle concerned, it will be apparent that it could equally well be positioned at the front or the sides of the vehicle. For each assembly, one or more of the springs 7 could be used to indicate movement of the beam of the bumper assembly.

What is claimed is:

1. A road vehicle having a fluid operated braking system for applying vehicle brakes and a bumper assembly fitted thereto and extending transversely of one end of the vehicle, said assembly comprising a transverse beam which is supported by an arm from the vehicle so that the beam is pivotable from a rest position in a direction towards or beneath the vehicle in the event of the assembly contacting an obstacle and spring means for biasing the beam towards its rest position, wherein the spring means comprises at least one compressible chamber which is compressed when said bumper assembly contacts the obstacle, the chamber being in fluid communication with a pressure sensing device which is connected to the braking system so as to cause application of the vehicle brakes on pivoting displacement of the beam assemblyl, wherein the at least one chamber is defined by hollow interior portions of the spring means and the spring means bears against a sealing surface when the beam is in the rest position to sealingly close the hollow interior portions of the at least one chamber, and wherein the sealing surface is provided by a sealing seat having a curved profile to engage with the spring means.

2. A road vehicle in accordance with claim 1 wherein the volume of the at least one chamber is reduced by compression of the spring means on displacement of the beam, said reduction of volume causing at least partial expulsion of contents of the at least one chamber to provide a signal indicative of displacement of the beam.

3. A road vehicle in accordance with claim 1 wherein the spring means bears against a sealing surface when the beam is displaced in the direction towards or beneath the vehicle, the sealing surface bearing against the spring means to sealingly close the hollow interior portions and close the at least one chamber.

4. A road vehicle in accordance with claim 1 wherein the sealing surface is part of the bumper assembly.

5. A road vehicle in accordance with claim 1 wherein the sealing seat is a discrete component of the bumper assembly.

6. A road vehicle in accordance with claim 1 wherein a self-cleaning wiping action is produced between the spring means and the sealing surface as the spring means is brought into engagement with the sealing surface.

7. A road vehicle in accordance with claim 1 wherein the pressure sensing device is located remote from the spring means.

8. A road vehicle in accordance with claim 7 wherein a warning device is connected to the pressure sensing device, said warning device being operable on pivoting displacement of the beam.

9. A warning device in accordance with claim 8 wherein the warning device produces an audible signal.

10. A road vehicle in accordance with claim 8 wherein the warning device produces a visual signal.

11. A road vehicle in accordance with claim 8, wherein the warning device is in proximity to a driving position.

12. A road vehicle in accordance with claim 9 wherein the warning device is a horn.

13. A road vehicle in accordance with claim 1 and further comprising a length of tubing connecting the at least one chamber with the pressure sensing device.

14. A road vehicle in accordance with claim 1 and further comprising holding means for maintaining the beam in the rest position during normal operational use.

15. A road vehicle in accordance with claim 14 wherein said holding means biases the beam in the direction towards or beneath the vehicle.

16. A road vehicle in accordance with claim 1, further comprising holding means for maintaining the beam in the rest position during normal operational use, and wherein the holding means maintains the spring means in engagement with the sealing surface.

17. A vehicle as claimed in claim 1 which includes a second spring means arranged to act between the arm and the beam so as to damp movement of the beam after displacement.

18. A vehicle as claimed in claim 1, further comprising means for selectively preventing the braking system from being activated by the pressure sensing device.

* * * * *